Oct. 24, 1933.  G. G. FISHER  1,931,490
LEVEL PROTRACTOR
Filed Oct. 3, 1930   2 Sheets-Sheet 2
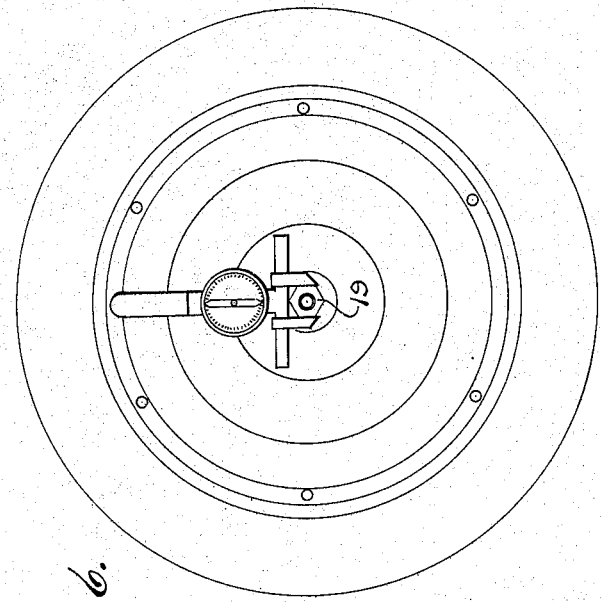
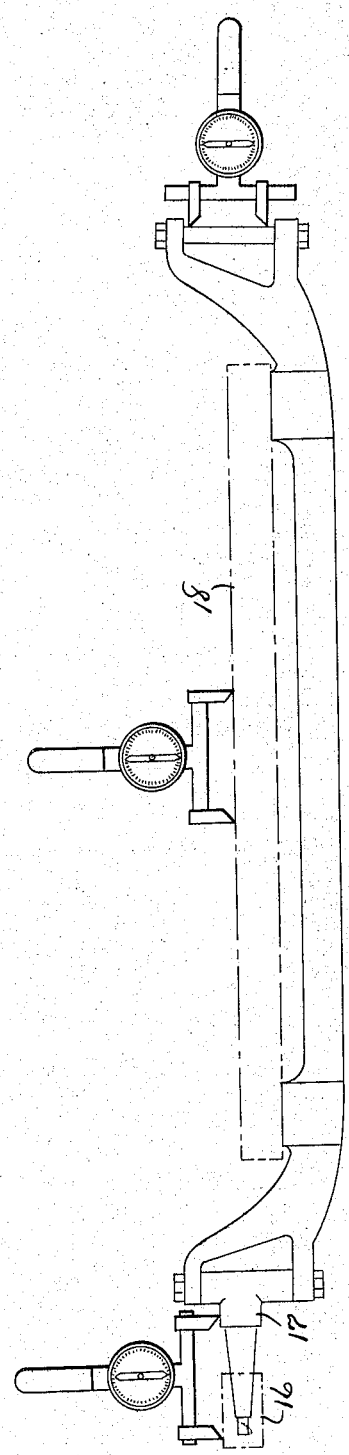
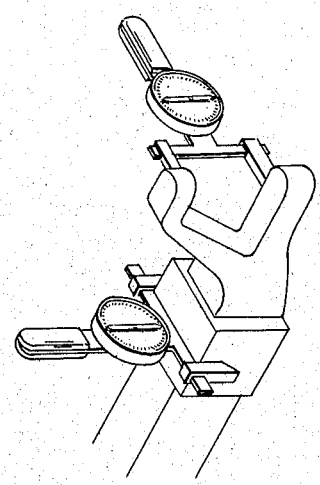

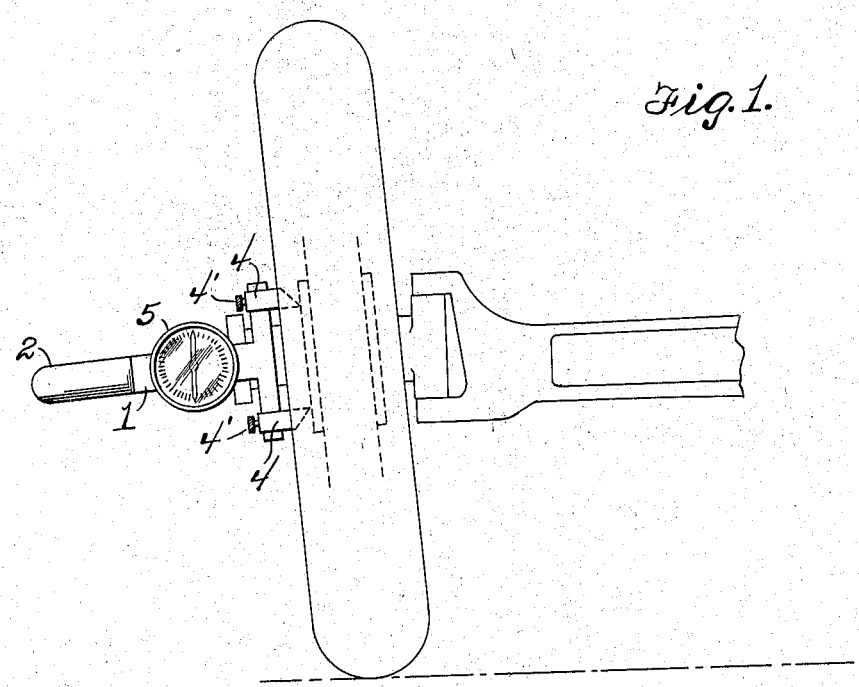
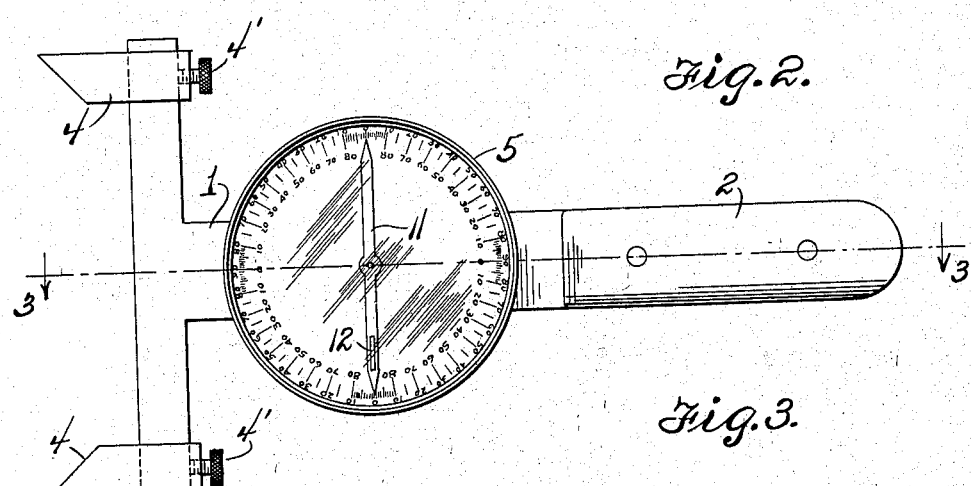
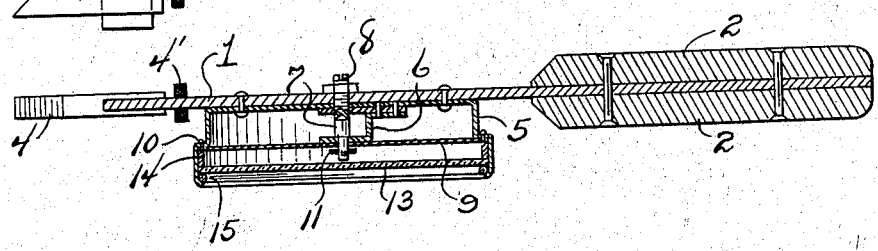

Patented Oct. 24, 1933

1,931,490

UNITED STATES PATENT OFFICE

1,931,490

LEVEL PROTRACTOR

Gordon G. Fisher, Indianapolis, Ind.

Application October 3, 1930. Serial No. 486,250

5 Claims. (Cl. 33—207)

This invention relates to a gauge or protractor for determining when an object is level or plumb or how many degrees the object departs from the level or plumb position. The invention is particularly applicable to checking the parts of an automobile axle or running gear. The general object of the invention is to provide a gauge which can be used in checking the angularity at several points in an automobile axle and running gear assembly in rapid succession without intricate adjustments of the gauge.

The principal feature of the invention resides in the provision of a T-shaped base member, the shank of the T-constituting a handle and the head of the T carrying adjustable members which may be placed against the surface to be checked. A protractor dial, preferably of the gravity type, is located upon the T-shaped base between the handle and the head. A tool so constructed may be quickly and easily moved from one surface to another and requires little or no change for checking surfaces which are quite dissimilar. The particular location of the protractor dial with respect to the head of the T and handle adds greatly to the ease and rapidity in the use of the tool.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a view showing the device used on the front wheel of a vehicle to indicate the amount of inclination of the wheel.

Figure 2 is a front view of the device.

Figure 3 is a section on line 3—3 of Figure 2.

Figure 4 is a view showing the use of the device on different parts of the front axle assembly.

Figure 5 is a view showing the use of the device on different parts at one end of the axle.

Figure 6 is a view showing the use of the device to ascertain the degree the axle is tilted forwardly or rearwardly.

In these views, the numeral 1 indicates a flat T shaped member having the handle forming parts 2 fastened to the end of its stem, with the rightangular projections 4 at the ends of the head of the T so that the ends of these projections can be placed against an object when the device is in use. Each projection 4 has a hole therein to receive a part of the head so that the projections are adjustably mounted on the head and are held in adjusted position by the set screws 4'. The outer end of each projection is beveled, as shown.

A casing 5 is fastened to the stem between the handle parts and the head and a bracket 6 is placed in the casing and suitably supported therein. This bracket rotatably supports a small shaft 7 which has a conical end engaging a conical recess in a set screw 8 which passes through the stem and the bottom of the casing, as clearly shown in Figure 3.

A dial plate 9 is arranged in the casing and covers the bracket and has its periphery connected to a shoulder 10 formed in the casing. The shaft 7 passes through the central part of this dial plate and a finger 11 is fastened at its center to the shaft so that this finger will operate over the dial on the plate. One end of the finger is weighted, as shown at 12, so that the finger will always assume a vertical position. A transparent plate 13 covers the finger and the dial plate and contacts a ring-shaped spacer 14 placed between the transparent member and the dial plate, with a ring 15 for holding the transparent member in position. The dial plate is preferably graduated in such a manner that there is a zero mark at each quarter, with the double row of numerals on the dial reading right and left from each zero mark, and with fine graduations at each zero mark, as shown in Figure 2.

From the foregoing it will be seen that I have provided a simple device for indicating whether or not an object is plumb or level and the degrees of variations of an object from the vertical or horizontal.

Figure 1 shows how the device can be used to indicate the degree of inclination or camber of a front wheel of a motor vehicle so that it can be used to facilitate the adjustments of the front wheels.

The left hand end of Figure 4 shows the tool used to ascertain the tilt of one of the front spindles and when this is done, an adapter 16 is placed on the end of the spindle. The adapter is a cylindrical member having a bore fitting the spindle and having its outer surface corresponding in size to the shoulder 17 of the spindle so that one of the projections 4 is placed against the shoulder and the other against the adapter. When this is done, the finger will indicate on the dial the tilt of the spindle. At the right end of Figure 4, the tool is shown in use to ascertain the inclination of the king pin. At the center of Figure 4, the use of the tool is shown to ascertain whether or not the axle is level endwise. When this is done, a straight-edge 18 is placed on the spring pads of the axle and the tool placed against the straight edge.

Figure 5 shows the use of the tool to ascertain whether or not the axle is level crosswise and at the right end of the figure, the use of the tool is shown to ascertain the forward or backward tilt of the axle yoke relative to the spring pads.

Figure 6 shows the projections 4 moved inwardly to engage the spindle nut 19 after the hub cap has been removed and the wheels are in a straight position. By turning the wheels, the tool will indicate the degree of backward or forward tilt, or caster of the axle. It will, of course, be understood that the tool can be used for other purposes than those shown and that the projections 4 can be entirely removed and the head placed directly against an object, if desired.

It is thought from the foregoing description that the advantages and novel features of the invention will be readily apparent.

It is to be understood that changes may be made in the construction and in the combination and arrangement of the several parts, provided that such changes fall within the scope of the appended claims. For example, a weighted rotatable dial may be substituted for the weighted rotatable pointer 11, the said dial having graduations thereon such as those on dial 9. A pointer is then used which is fixed to the casing. This may be considered a mere reversal of the parts shown in the drawings.

What I claim is:—

1. A device of the class described including a substantially T-shaped base, the stem thereof shaped to form a handle, pointed elements adjustably slidable upon each arm of the T-head and projecting therefrom in a direction substantially opposite to said stem, and a gravity operated protractor element mounted upon said base between the handle and the T-head.

2. A device of the class described including a substantially T-shaped base having its stem shaped to form a handle, a dial member and a pointer member mounted on said stem between the T-head and the handle portion, one of said members being rotatably mounted and the other being fixedly mounted upon said stem and the rotatably mounted member being weighted so as to assume a fixed angular relationship to the horizontal, and an element adjustably slidable upon each arm of the T-head and projecting therefrom in a direction substantially opposite to said stem.

3. A device of the class described including a substantially T-shaped base having a straight edge formed on the head thereof and the end of the stem thereof forming a handle, a dial member and a pointer member mounted on said stem between the head and the handle portion, one of said members being rotatably mounted and the other being fixedly mounted upon said stem and the rotatably mounted member being weighted so as to assume a fixed angular relationship to the horizontal, and a pointed element adjustably slidable upon each arm of the T-head, the points of said elements being equidistant from the straight edge of the T-head and projecting therefrom in a direction substantially opposite to said stem.

4. A device of the class described including a substantially T-shaped base having a straight edge formed on the head thereof and the end of the stem thereof forming a handle, a dial member and a pointer member mounted on said stem between the head and the handle portion, one of said members being rotatably mounted and the other being fixedly mounted upon said stem and the rotatably mounted member being weighted so as to assume a fixed angular relationship to the horizontal, and an element adjustably slidable upon each arm of the T-head, each of said elements having a straight edge perpendicular to the straight edge upon said T-head and projecting therefrom in a direction substantially opposite to said stem.

5. A device of the class described including a substantially T-shaped base having a straight edge formed on the head thereof and the end of the stem thereof forming a handle, a dial member and a pointer member mounted on said stem between the head and the handle portion, one of said members being rotatably mounted and the other being fixedly mounted upon said stem and the rotatably mounted member being weighted so as to assume a fixed angular relationship to the horizontal, and a pointed element adjustably slidable upon each arm of the T-head, the points of said elements being equidistant from the straight edge of the T-head, and each of said elements having a straight edge perpendicular to the straight edge upon said T-head and projecting therefrom in a direction substantially opposite to said stem.

GORDON G. FISHER.